United States Patent [19]

Harrison

[11] Patent Number: 5,427,287
[45] Date of Patent: Jun. 27, 1995

[54] SPARE TIRE CARRIER

[76] Inventor: Rick Harrison, R.R. 4, Mount Carmel, Ill. 62863

[21] Appl. No.: 124,099

[22] Filed: Sep. 20, 1993

[51] Int. Cl.⁶ .............................................. B62D 43/02
[52] U.S. Cl. .............................. 224/42.21; 224/42.24
[58] Field of Search ............... 224/42.21, 42.24, 42.29, 224/42.12, 42.06

[56] References Cited

U.S. PATENT DOCUMENTS

| | | | |
|---|---|---|---|
| 1,962,835 | 6/1934 | Pawsat | 224/42.24 |
| 2,701,670 | 2/1955 | Hutchinson | 224/42.24 |
| 2,805,807 | 9/1957 | Slack | 224/42.24 |
| 2,819,004 | 1/1958 | Kubik et al. | 224/42.21 |
| 3,251,520 | 5/1966 | Van Dyke et al. | 224/42.06 X |
| 4,387,837 | 6/1983 | Carr et al. | 224/42.21 |
| 4,971,237 | 11/1990 | Davis | 224/42.06 |
| 5,108,020 | 4/1992 | Patrick et al. | 224/42.06 X |
| 5,303,569 | 4/1994 | Wright | 224/42.24 |

Primary Examiner—Renee S. Luebke
Attorney, Agent, or Firm—Heller & Kepler

[57] ABSTRACT

A spare tire carrier for carrying one or more spare tires with an on-off road utility vehicle. The spare tire carrier is of the type for mounting to the roll bar present in on-off road utility vehicles to prevent roll over and/or occupant damage. The spare tire carrier accommodates various sized spare tire and wheel combinations and can be attached to all of the different sized commercially manufactured roll bars utilized in on-off road utility vehicles of this type. Additionally, the spare tire carrier is rotatably mounted on the roll bar thereby permitting the spare tire to be carried either inside the passenger or cargo areas or outside the on-off road utility vehicle as conditions dictate. The spare tire carrier comprises a base, a base arm, a platform, and a platform arm.

10 Claims, 6 Drawing Sheets

SPARE TIRE CARRIER

BACKGROUND OF THE INVENTION

The present invention relates in general to spare tire carriers and pertains more particularly to a spare tire carrier which is mounted to a roll bar attached to an on-off utility vehicle. The spare tire carrier of this invention is an improvement over the conventional tailgate mounted or internally floor/sidewall mounted methods of carrying a spare tire with an on-off road utility vehicle.

With a conventional spare tire carrier mounted at the rear tailgate area of an on-off road utility vehicle, or other vehicle with an exterior spare tire mount, it is generally necessary that the spare tire be mounted on a swing-away type carrier or that the tailgate design be modified so that the tailgate itself swings open so that the mounting position of the spare tire does not interfere with the normal operation of the tailgate A drawback with the conventional spare tire carrier mounted in an alternative internal position within the vehicle is that it is in a fixed position, typically mounted to the interior side wall of the on-off road utility vehicle and resting on the interior floor. This fixed position allows no flexibility and consumes valuable interior space.

Accordingly, it is an object of the present invention to provide an improved spare tire carrier mountable to the roll bar of an on-off road utility vehicle or other suitable vehicle. With the roll bar mounted spare tire carrier, the mounting of the spare tire does not interfere with the normal operation of the tailgate nor any other functional device of the on-off road utility vehicle.

Another object of this invention is to provide a spare tire carrier pivotally mountable to the roll bar, thereby increasing flexibility by allowing the spare tire to be rotated outside the vehicle when maximum interior floor space or cargo space is needed and rotated inside the passenger or cargo areas of the vehicle when conditions such as installing a vehicle cap or cover warrant.

Still another object of the present invention is to provide the capability of carrying multiple spare tires for extended back county trips by mounting multiple spare tire carriers on opposite sides of a roll bar.

Still a further object of the present invention is to provide not only the ability to carry multiple spare tires but the ability to carrying multiple types of spare tires, some of which can be utilized for unique terrain.

SUMMARY OF THE INVENTION

To accomplish the foregoing and other objects of this invention there is provided a spare tire carrier for mounting to the roll bar of an on-off road utility vehicle or other suitable vehicle.

The spare tire carrier comprises means for securing a wheel mounted to a spare tire, means for attaching the securing means to a on-off road utility vehicle or other suitable vehicle and means for extending the securing means away from the attachment means. The spare tire carrier further comprises fastening means, holding means, clamping means and supporting means.

The attachment means comprise clamping means and supporting means. In a preferred embodiment, the supporting means consist of a base which is attached to the roll bar by clamping means comprising a rounded member, the clamping means are sized to conform to the various diameters of commercially manufactured roll bars installed in on-off road utility vehicles.

The extending means comprise a base arm and a platform arm. In a preferred embodiment, the base arm is rigidly attached to the front side of the base, extending outward and generally perpendicular to the plane of the base. The base arm is attached to the platform arm by one or more bolt and nut combinations, the bolts passing through one or more aligned holes in both the base arm and the platform arm. The platform arm is rigidly attached to the back side of the platform extending outward and generally perpendicular to the plane of the platform.

One or more of the holes in both the base arm and the platform arm are located so as to allow the user the ability to adjust the distance between the base and the platform by selecting the appropriate combination of holes to be aligned and attached by the bolt and nut combinations. This length adjustability is desired in order to provide for the spare tire carrier to be capable of carrying a plurality of different spare tire sizes.

The wheel mounted to the spare tire is attached to the platform by at least one threaded member extending outward from the platform.

In a preferred embodiment, the platform has a plurality of holes through which a plurality of threaded members are received, the head end of each threaded member is rigidly attached to the back side of the platform. In such an arrangement, the plurality of holes in the platform and the corresponding threaded members projecting through the platform holes are located so as to permit the threaded members to pass through the standard hole pattern in a commercially manufactured wheel mounted to a spare tire.

The threaded member receives a nut after passing through the hole in the wheel. The nut is subsequently tightened to secure the spare tire to the carrier which is attached to the on-off road utility vehicle. In the disclosed embodiment described herein, the threaded members comprise bolts having threads for receiving common lug nuts used for typically attaching the primary tire and wheel combination to a on-off road utility vehicle.

In the preferred embodiment the base, the base arm, the platform, and the platform arm comprise plain carbon steel and may be painted to match the on-off road utility vehicle's color.

BRIEF DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

Figure 1:
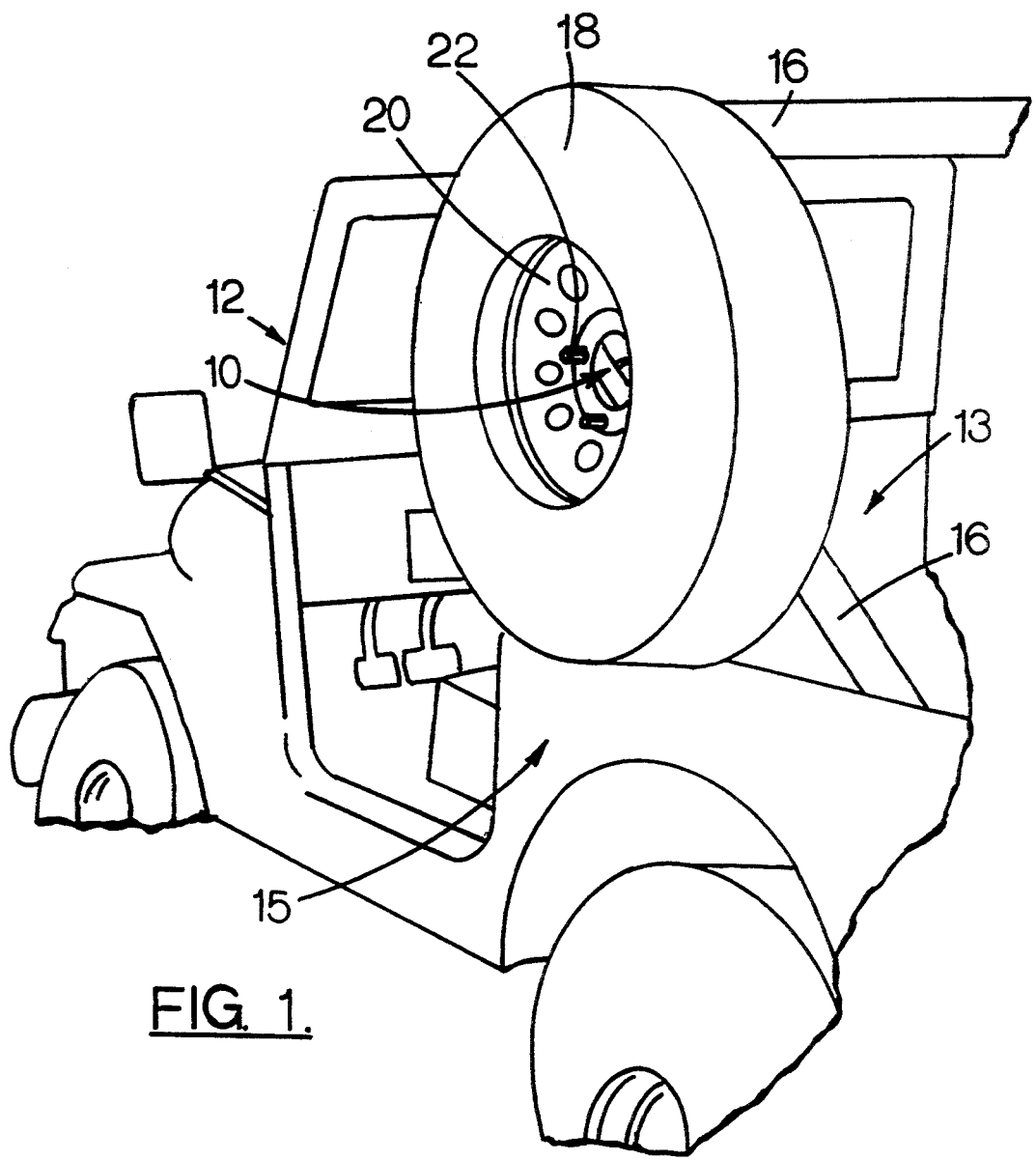
FIG. 1 is a perspective view of the spare tire carrier mounted to the roll bar in a on-off road utility vehicle.
Figure 2:
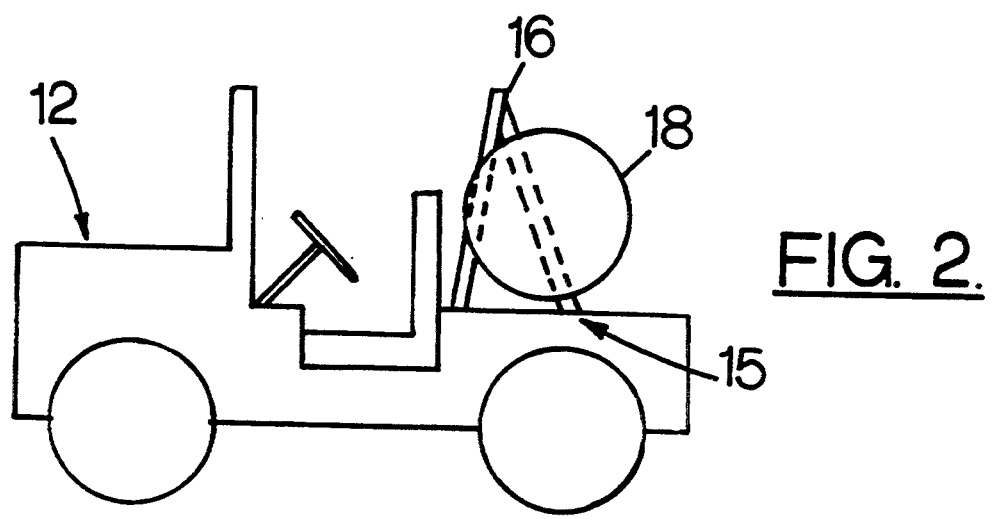
FIG. 2 is an elevation view of the spare tire carrier and spare tire mounted on an on-off road utility vehicle in accordance with one preferred embodiment of the present invention shown rotated for carrying the spare tire on the exterior of the vehicle.
Figure 3:
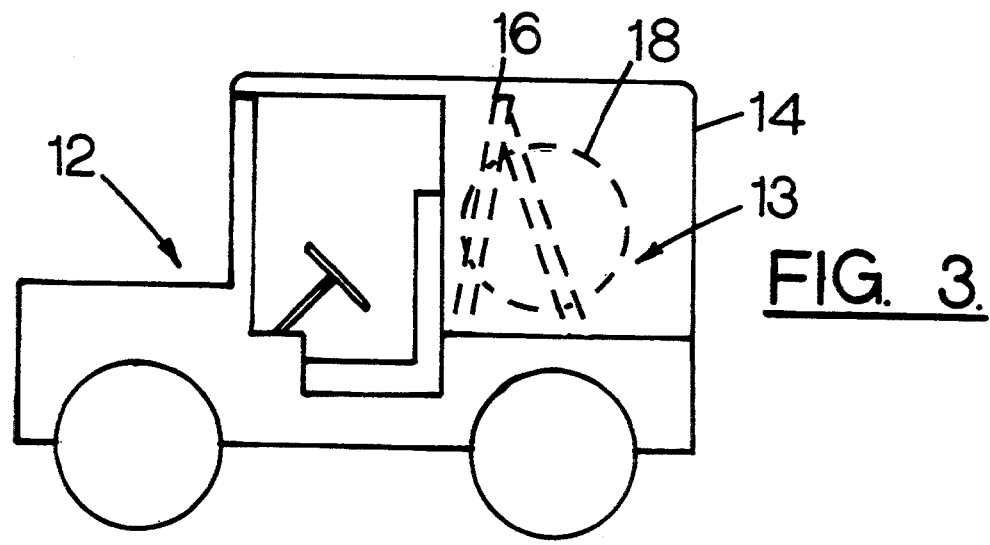
FIG. 3 is an elevation view of the spare tire carrier and spare tire mounted on the on-off road utility vehicle in accordance with one preferred embodiment of the present invention shown rotated for carrying the spare tire on the interior of the vehicle with a top installed.
Figure 4:
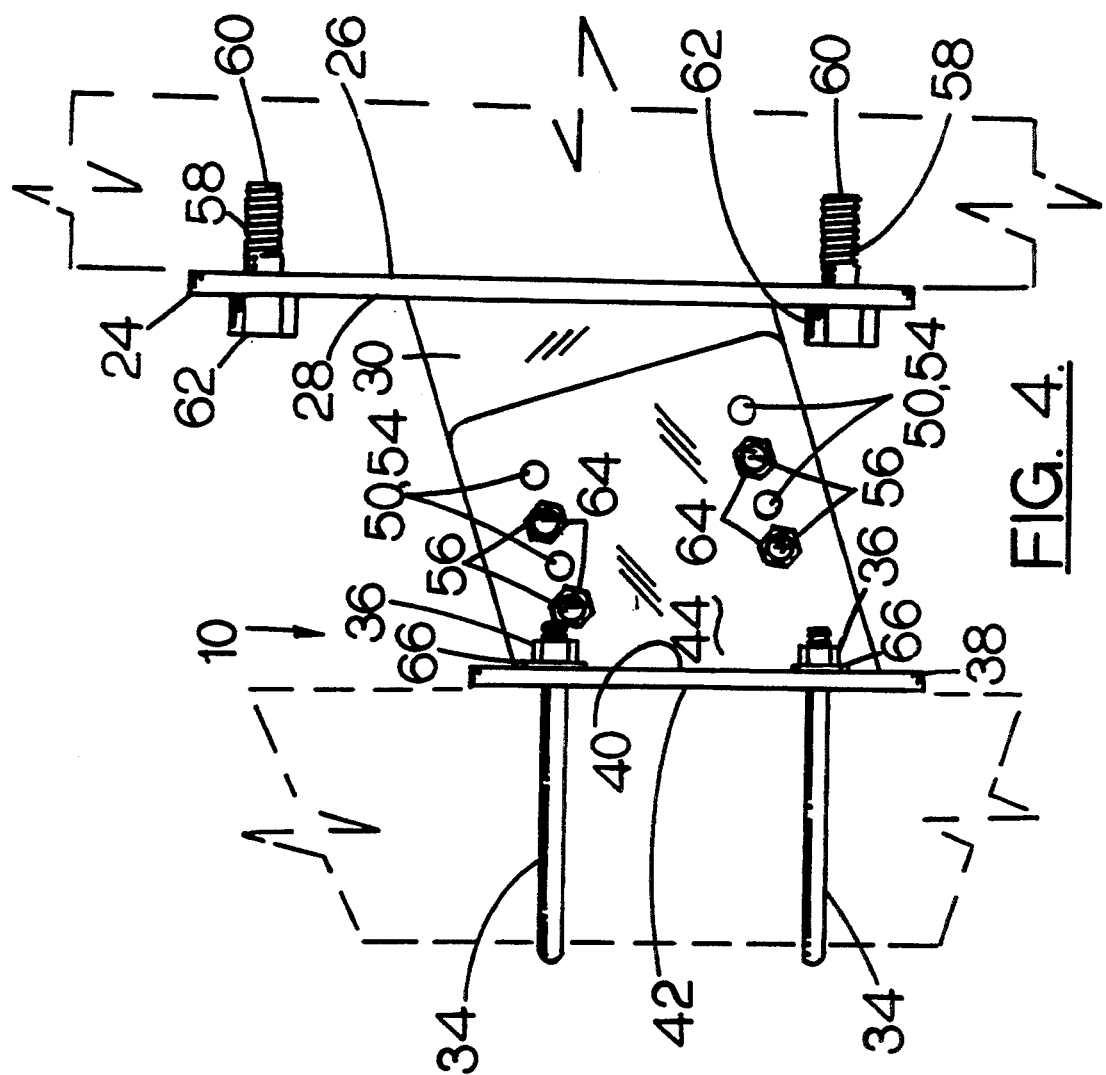
FIG. 4 is a side view of the spare tire carrier of the present invention.
Figure 5:
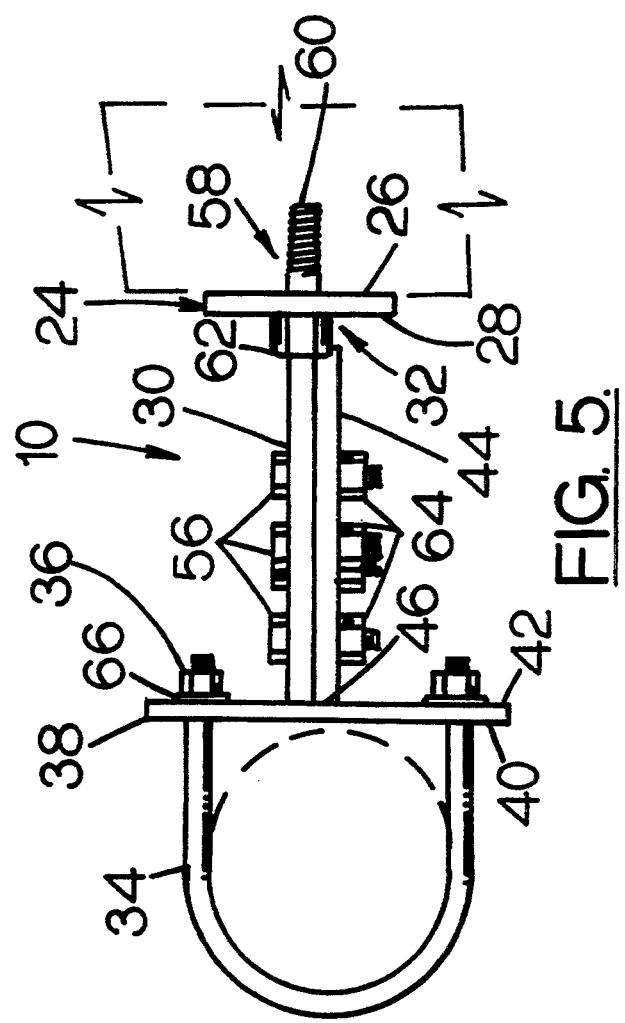
FIG. 5 is a plan view of the spare tire carrier of the present invention.
Figure 6:
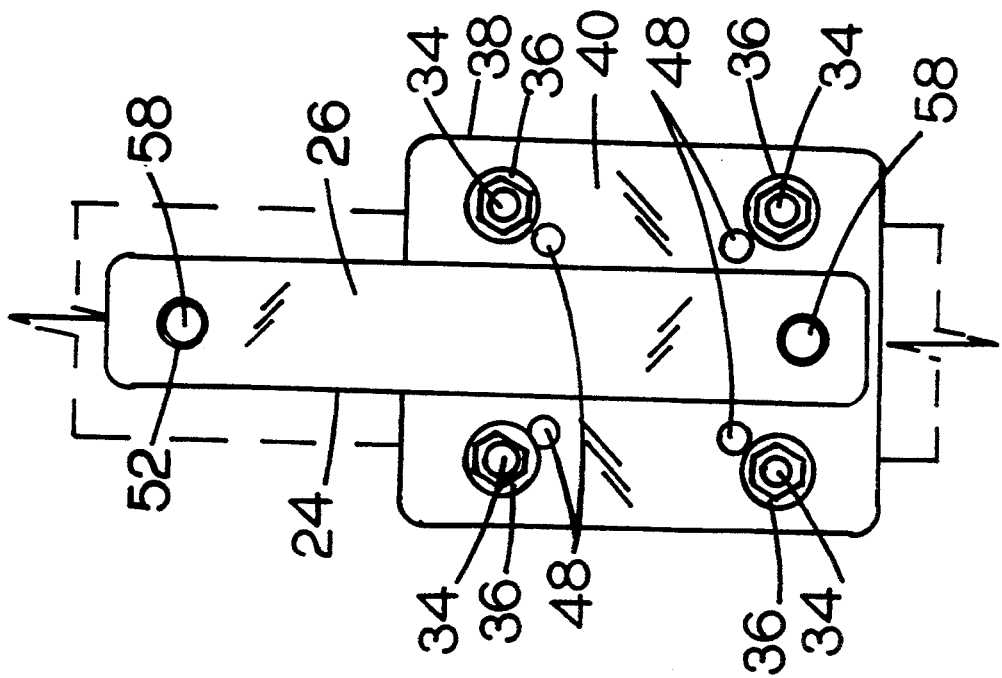
FIG. 6 is a front view of the spare tire carrier of the present invention.
Figure 7:
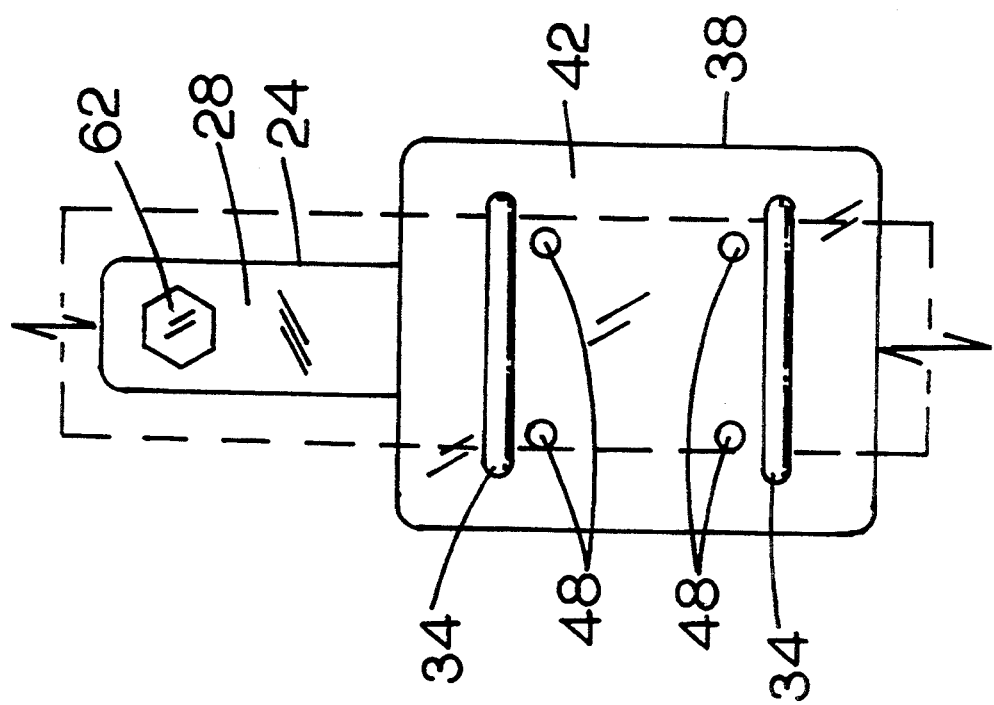
FIG. 7 is a rear view of the spare tire carrier of the present invention.

Referring now to the drawings there is shown a preferred embodiment for the spare tire carrier of this invention. The spare tire carrier is described in connection with a spare tire typically carried by an on-off road utility vehicle. The spare tire carrier is particularly adapted for attachment to the roll bar commonly utilized in a conventional on-off road utility vehicle to minimize roll over damage and protect occupants. It will be understood that the present invention is also suitable for use on other vehicles with roll bars.

The drawings show the spare tire carrier 10 in conjunction with a on-off road utility vehicle 12 having a roll bar 16. The spare tire carrier 10 comprises means for securing a wheel mounted to a spare tire, means for attaching the securing means to the on-off road utility vehicle 12 and means for extending the securing means away from the attachment means.

The attachment means comprises clamping means and supporting means, the clamping means further comprise a rounded member and in a preferred embodiment consisting of U-shaped clamps 34 of the type commonly used to secure automobile exhaust systems. The supporting means further comprises a base 38.

The securing means comprises fastening means and holding means, the fastening means further comprising a threaded member 58 and nut 22 combination, the holding means further comprising a platform 24.

The extending means comprises a base arm 44 and a platform arm 30 adjustably attached by a bolt 56 and nut 64 combination passing through one or more holes 50 in the base arm 44 and one or more holes 54 in the platform arm 30.

In a preferred embodiment, the base 38 has a front side 40 and a back side 42 and the base is substantially square in shape and has a plurality of holes or openings therethrough.

In the preferred embodiment illustrated in the drawings there are four pairs of holes 48 extending from the front side 40 through the back side 42. The center to center distance between the first and fourth pair of holes in one preferred embodiment is approximately 2.75" and corresponds to a 2.5" diameter commercially manufactured roll bar. The center to center distance between the second and third pair of holes is approximately 2.5" and corresponds to a 2.25" diameter commercially manufactured roll bar.

Also in the preferred embodiment described herein, the holes receive a plurality of U-shaped clamps 34 of a size which fit in each pair of corresponding holes 48. Two U-shaped clamps 34 and nuts 36 are used to secure the base 38 to the roll bar 16. The selection of which particular two pairs of holes 48 corresponding to the particular two U-shaped clamps 34 is based on the diameter of the roll bar 16 to which the spare tire carrier 10 is to be attached.

It will be clear that the use of roll bars with diameters different than those discussed herein will require corresponding U-shaped clamps which are sized accordingly to fit around the roll bar as herein described.

In the disclosed embodiment described herein, the base 38 is attached to the base arm 44. The base arm 44 has an edge 46 which is preferably welded to the front side 40 of the base 38. The base arm 44 is preferably attached substantially perpendicular to the plane of the base 38, however this relationship between the base arm and the base is not absolutely necessary. The base arm 44 contains one or more holes 50 for attachment to the corresponding one or more holes 54 contained in the platform arm 30.

The base arm 44 and the platform arm 30 are preferably attached by the combination of one or more bolts 56, and tightened nuts 64. The bolts 56 are selected so as to pass through both the base arm holes 50 and the platform arm holes 54, therefore maintaining the desired alignment between the base arm 44 and the platform arm 30.

In a preferred embodiment, the base arm 44 has a plurality of holes 50, and the platform arm 30 has a plurality of holes 54. The placement of the plurality of holes 50 in the base arm 44 and the plurality of holes 54 in the platform arm 30 allows a range of attachment points thereby permitting the combined length of the base arm 44 and the platform arm 30 to be adjusted in order to carry a wide variety of different size spare tires 18.

In the preferred embodiment, the opposite edge 32 of the platform arm 30 is welded to the back side 28 of the platform 24. The platform arm 30 is attached substantially perpendicular to the plane of the platform 24, in the preferred embodiment. The platform 24 is substantially rectangularly shaped and contains at least one extended threaded member 58, but preferably a plurality of extended threaded members.

Also in the preferred embodiment, the platform 24 has one or more holes 52 spaced a centerline distance apart, wherein this centerline distance corresponds to a distance center to center between two preferably non-adjacent holes on a commercially manufactured wheel 20.

A threaded member 58 passes through its respective hole 52. The threaded members 58 typically have a head end 62 and a threaded end 60. The threaded member 58 passes through the hole 52 from the back side 28 to the front side 26 of the platform 24. The head end 62 of the threaded member 58 is preferably welded to the back side 28 of the platform 24 in order to prevent turning of the threaded member 58.

Alternative means for affixing the threaded member to the platform will be recognized by one skilled in the art.

The threaded end 60 of the threaded member 58 passes through the respective wheel holes of a commercially manufactured wheel 20 mounted to the spare tire 18.

A lug nut 22 on the threaded member 58 is provided to tighten the spare tire 18 against the platform 24. In a preferred embodiment, the threaded member 58 is a stud bolt of the type having threads for receiving common lug nuts 22 typically used for attaching the primary tire and wheel combination to the vehicle 12.

In operation, the spare tire carrier 10 is rotatably attached to the roll bar 16 thereby allowing the spare tire 18 to be carried either in the interior passenger or cargo area of the vehicle 13 or, rotated outside, the spare tier carrier allows the spare tire 18 to be carried on an exterior portion 15 of the vehicle.

When carrying the spared tire in the interior of the vehicle, it is possible to utilize a vehicle cap or cover 14 with the vehicle 12.

Additionally, the mounting height of the spare tire carrier 10 can be adjusted to accommodate interior passenger or cargo space requirements without having to remove the spare tire 18 from the vehicle 12 as is often the case with traditional methods of mounting a spare tire 18 within the passenger or cargo area of vehicle 12.

In a preferred embodiment the spare tire carrier is painted to correspond to the different commercially available vehicle colors and is capable of being mounted in any vehicle having a commercially manufactured roll bar. Such vehicles include but are not limited to JEEPS ® and pickup trucks.

From the foregoing description those skilled in the art will appreciate that all of the objects of the present invention have been realized. A spare tire carrier has been shown and described for providing an improved spare tire carrier mountable to the roll bar of an on-off road utility vehicle or other suitable vehicle. With the roll bar mounted spare tire carrier, the mounting of the spare tire does not interfere with the normal operation of the tailgate nor any other functional device of the on-off road utility vehicle.

The spare tire carrier of this invention provides a carrier that is mounted to pivot or rotate relative to the roll bar, thereby increasing flexibility by allowing the spare tire carrier and the spare tire to be outside or inside the vehicle.

Multiple spare tire carriers may be mounted in any suitable vehicle therefore providing the ability to carrying multiple spare tires. Additionally, the spare tire carrier is capable of carrying any commercially manufactured spare tire of the sizes normally used on-off road utility vehicles. Furthermore, the ability to carry multiple types of spare tires allows for greater flexibility in having different tire tread designs to match with the different types of terrain likely to be encountered.

While specific embodiments have been shown and described, many variations are possible. The base, platform, base arm, and platform arm are illustrated as plates but could be other shapes or stock types. The particular shape of the base, platform, base arm, and platform arm including all dimensions can change as desired to suit the vehicle with which it is used.

Having described the invention in detail, those skilled in the art will appreciate that modifications may be made of the invention without departing from its spirit. Therefore, it is not intended that the scope of this invention be limited to the specific embodiments illustrated and described. Rather, it is intended that the scope of this invention be determined by the appended claims and their equivalents.

What is claimed is:

1. A spare tire carrier for attaching a wheel mounted to a spare tire comprising:
    a base having a front side and a back side, the base having a pair of holes and an other pair of holes extending through the base from the front side to the back side;
    a clamp having an end and another end, the ends of the clamp fitting into the pair of holes;
    another clamp having an end and another end, the ends of the other clamp fitting into the other pair of holes;
    a base arm extending outward from the front side of the base, the base arm having one or more holes for receiving a bolt and a nut combination;
    a platform having a front side and a back side, the platform having at least one threaded member extending outward from the front side of the platform; and
    a platform arm extending outward from the back side of the platform, the platform arm having one or more holes for receiving the bolt and nut combination, the platform arm and the base arm adjustably attached by a nut and bolt combination, wherein the holes in both the base arm and the platform arm are located various distances apart so that the distance between the base and the platform can be adjusted by selecting the appropriate holes for receiving the nut and bolt combination, thereby accommodating the attachment of spare tires of varying widths.

2. A spare tire carrier for attaching a wheel mounted to a spare tire as set forth in claim 1 wherein a center to center distance between the pair of holes in the base and an other center to center distance between the other pair of holes in the base is substantially the same.

3. A spare tire carrier for attaching a wheel mounted to a spare tire as set forth in claim 1 wherein a center to center distance between the ends of the clamp and an other center to center distance between the ends of the other clamp is substantially the same.

4. A spare tire carrier for attaching a wheel mounted to a spare tire as set forth in claim 1 wherein the front side of the platform is in direct contact with a back side of a wheel mounted to a spare tire.

5. A spare tire carrier for attaching a wheel mounted to a spare tire as set forth in claim 1 wherein the platform has one or more holes for receiving the threaded member, the threaded member having a head-end and an opposite threaded-end, the threaded member extending through the hole from the back side of the platform to the front side of the platform, the head-end of the threaded member rigidly attached to the back side of the platform.

6. A spare tire carrier for attaching a wheel mounted to a spare tire as set forth in claim 1 wherein the wheel mounted to the spare tire is attached to the platform by a plurality of threaded members rigidly attached to the platform at various locations such that the threaded members can be received by a plurality of holes contained in various commercially manufactured wheels.

7. A spare tire carrier for attaching a wheel mounted to a spare tire as set forth in claim 6 wherein the plurality of threaded members passing through the holes in the wheel mounted to the spare tire receive a commercially manufactured lug nut.

8. A spare tire carrier for attaching a wheel mounted to a spare tire as set forth in claim 1 wherein the base is attached to a roll bar mounted in an on-off road utility vehicle by the clamp and the other clamp.

9. A spare tire carrier for attaching a wheel mounted to a spare tire as set forth in claim 8 wherein the base has a plurality of pairs of holes located different distances apart, the different distances allowing attachment to roll bars of different diameters.

10. A spare tire carrier for attaching a wheel mounted to a spare tire as set forth in claim 8 wherein the back side of the base is in direct contact with the roll bar and the base is rotatably attached with the front side of the base capable of facing either an interior or an exterior of the on-off road utility vehicle, thereby allowing the spare tire to be carried either inside or outside the on-off road utility vehicle.

* * * * *